United States Patent
Pearce

(10) Patent No.: US 6,929,422 B2
(45) Date of Patent: Aug. 16, 2005

(54) SHORE PROTECTIVE BARRIER SYSTEM

(76) Inventor: Frank E. Pearce, 58 Wayside Dr., Cliffwood Beach, NJ (US) 07735

( * ) Notice: Subject to any disclaimer, the term of this patent is extended or adjusted under 35 U.S.C. 154(b) by 52 days.

(21) Appl. No.: 10/418,475

(22) Filed: Apr. 21, 2003

(65) Prior Publication Data

US 2004/0208701 A1 Oct. 21, 2004

(51) Int. Cl.⁷ .................................................. E02B 3/04
(52) U.S. Cl. .............................. 405/15; 405/22; 405/33; 405/302.6
(58) Field of Search .............................. 405/15–22, 25, 405/29, 30, 31, 33, 35, 302.6; 256/13.1, 15

(56) References Cited

U.S. PATENT DOCUMENTS

| | | | | |
|---|---|---|---|---|
| 3,934,540 A | * | 1/1976 | Bruner et al. | 256/13.1 |
| 4,186,913 A | * | 2/1980 | Bruner et al. | 256/13.1 |
| 4,486,121 A | * | 12/1984 | Thompson et al. | 405/17 |
| 4,997,309 A | * | 3/1991 | Kiselewski | 405/16 |
| 5,178,489 A | * | 1/1993 | Suhayda | 405/21 |
| 5,238,325 A | * | 8/1993 | Krenzler | 405/21 |
| 5,370,475 A | * | 12/1994 | LeBlanc | 405/21 |
| 5,370,476 A | * | 12/1994 | Streichenberger | 405/25 |
| 5,645,371 A | * | 7/1997 | Marzullo | 405/33 |
| 6,375,387 B1 | * | 4/2002 | Gabor et al. | 405/18 |
| 6,558,076 B2 | * | 5/2003 | Liaw | 405/35 |

FOREIGN PATENT DOCUMENTS

GB 2275955 * 9/1994 ................. 405/15

* cited by examiner

Primary Examiner—Jong-Suk (James) Lee
(74) Attorney, Agent, or Firm—Charles I. Brodsky

(57) ABSTRACT

A shore protective barrier system for protecting an existing seawall in the face of heavy storms including a plurality of used automotive tires aligned upright in a row substantially side-by-side with one another, filled with concrete to form a single integrated unit sunk horizontally into the ground as a break wall.

13 Claims, 4 Drawing Sheets

SHORE PROTECTIVE BARRIER SYSTEM

CROSS-REFERENCE TO RELATED APPLICATIONS

None

STATEMENT REGARDING FEDERALLY SPONSORED RESEARCH OR DEVELOPMENT

Research and development of this invention and Application have not been federally sponsored, and no rights are given under any Federal program.

REFERENCE TO A MICROFICHE APPENDIX

Not Applicable

BACKGROUND OF THE INVENTION

1. Field of the Invention

This invention relates to the shore protective barrier systems, in general, and to the protection of seawalls in the face of heavy storms, in particular.

2. Description of the Related Art

As is well known and understood, one of the consequences of heavy coastal storms is the damage to land areas and houses adjacent to the shoreline. As will also be appreciated, to limit this, extensive effort is periodically taken to erect and maintain effective seawalls to protect against the pounding surf. Erected to heights of 5, 10, and 15 feet or so (depending upon conditions), these seawalls are typically constructed of boulders, building, sidewalk and foundation materials, blacktop surfaces, and whatever else could help stem the flow of the on-rushing tides. Experience has shown, however, that over time, these seawalls tend to break down and the individual restraining materials then become strewn along the beach and land areas separating the seawall from the water's edge. Clean-up, replacement and repair costs of the seawall then continue to extend into the Millions of dollars even while the homes and lands behind the seawall are protected. As will be appreciated, it would be desirable if the seawall could be protected as well as the structures and land masses which they themselves, protect.

SUMMARY OF THE INVENTION

As will become clear from the following description, the protective barrier system of the present invention utilizes a plurality of automotive tires filled with concrete, and sunk into the ground as an integrated unit with the individual tires oriented upright in substantially side-by-side relation with one another. A rebar of steel construction traverses horizontally through the single integrated unit to facilitate its grasping so as to allow the tires to be stacked vertically when being filled, and to seat within pilings driven into the ground either above or below the waterline, in any appropriate manner. Preferably composed of used automotive tires, the integrated unit can be joined with like units extending into the ground from a substantially common elevation in forming a row of concrete filled tires. Where appropriate, individual rows can be so formed, one behind the other, similarly sunk into the ground to join with pilings at different elevational positions in forming a laddering of such rows as high as required to meet any pounding surf condition. As the barrier effectively serves as a "break", offsetting the tires horizontally in one row from that of another serves to provide different channels for water flow in slowing down the impact of a surge, as the oncoming water then has different paths of travel—e.g. along the treads, between grooves of adjacent tires of each row, between the tires of the laddered rows, and through the tires themselves.

In general, therefore, it will be seen that the shore protective barrier system of the invention includes a plurality of automotive tires, along with first means for aligning individual ones of the automotive tires upright in a row substantially side-by-side with one another. Second means are included for joining adjacent tires together in forming a single integrated unit of a first plurality of tires, and of predetermined length. Third means are then utilized, traversing through the predetermined length of the first plurality of tires, for grasping the integrated unit for filling the automotive tires with concrete, and for sinking the opposing ends of the integrated unit into the ground. Two or more such integrated units can be joined together for forming a protective barrier row of tires, while a second pairing of integrated units at a higher elevation can serve in forming a second row of such protective concrete filled tires.

BRIEF DESCRIPTION OF THE DRAWINGS

These and other features of the invention will be more clearly understood from a consideration of the following description, taken in connection with the accompanying Drawings, in which.

DETAILED DESCRIPTION OF THE INVENTION

Figure 4A:
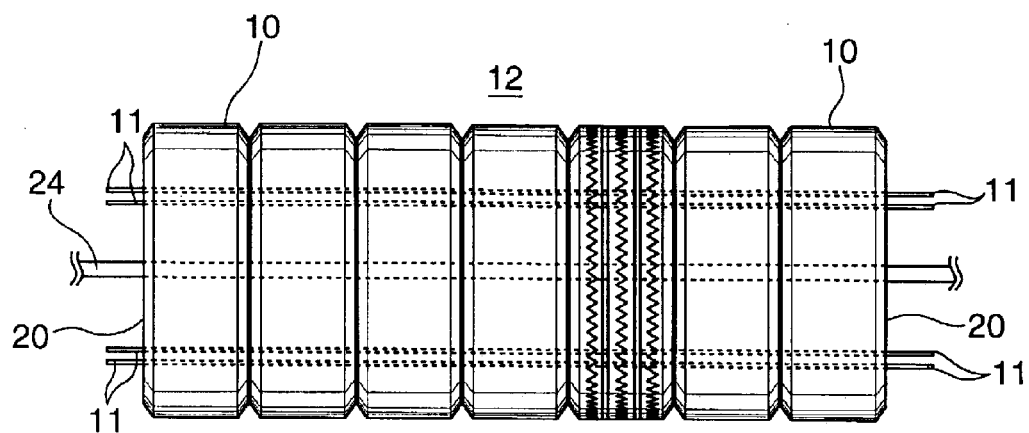
FIGS. 4a–4c are pictorial diagrams helpful in an understanding of a manner of aligning the individual tires of the integrated units and their filling with concrete for sinking into the ground.
Figure 4B:
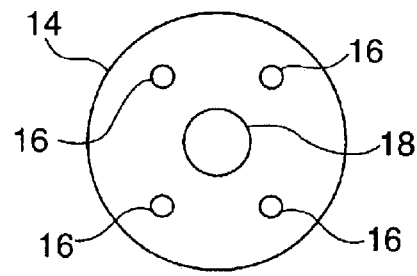
Figure 4C:
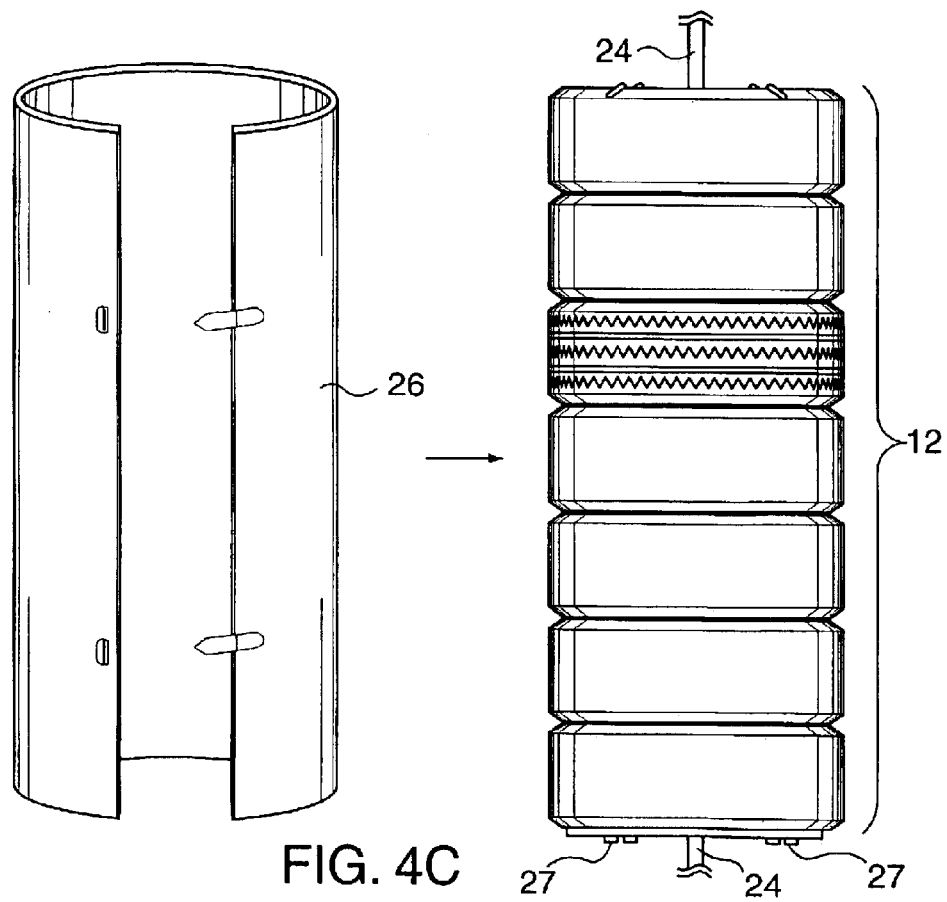

Referring to FIGS. 4a–4c of the Drawings, the shore protective barrier system of the invention first of all includes a plurality of automotive tires 10 (preferably used and discarded) of whatever size desired—ranging from automobile tires at the low end to large, heavy equipment tires at the high end. As is well known and understood, such tires oftentimes lie almost forever in landfills, breaking down very slowly (if at all), while taking up large areas of the limited space generally available. Shown by the reference numeral 11, means are provided for aligning individual ones of the tires upright in a row, joining adjacent tires substantially side-by-side in forming a single integrated unit 12 of a predetermined length. As illustrated, an end cap 14 is shown, apertured along its periphery at 16, along with a central opening 18. Individual ones of the automotive tires 10 are drilled along their opposing side surfaces 20 so as to receive the cable or rod aligners 11 extending through them in passing through to the apertures 16 in the end cap 14. A further cable or rod 24 extends through the center of the stacked alignment of tires to exit through to the central opening 18, and there fastened in position in any appropriate manner. Such cable or rod 24 (for example, a rebar of steel construction) serves as a means traversing through the tires its predetermined length for grasping (by mechanized crane or lift, for instance) to arrange the integrated unit 12 vertically for filling with concrete (FIG. 4c)—with a further steel jacket utilized, where desired, to fit around the tires 10 in holding them in place while the filling proceeds. Such jacket is shown at 26, with the cable or rod aligners shown fastened in place, as at 27. As will be appreciated, the concrete filling can be achieved in any appropriate manner—e.g., as by shooting gunite into the tires from above, or through the use of tubes guiding the concrete along so as to fill the tires individually, or in groups, rather than by gravitational filling from top to bottom. The end cap 14, in this respect, serves as a stop to restrain the concrete from leaching out the bottom end.

As will be understood, the cable or rod 24 can also serve in sinking the opposing ends of the integrated unit 12 into the ground. That is, when lifted by the mechanized crane to a horizontal position, the end of the cable or rod 24 extending through the integrated unit 12 could be fitted into a piling sunk into the ground in any appropriate manner, so as to seat the integrated unit 12 on the ground itself—above an existent water line at an ocean or bayside shore, or below the existent water line. The integrated unit 12 then serves essentially as a "break water reef".

A second such plurality of tires forming a second integrated unit could likewise be aligned colinearly with the first integrated unit, and fitted with a piling for forming a line of concrete filled tires as the needed barrier. In such an arrangement, both integrated units could then seat on the ground at a substantially common elevation in presenting an appearance as shown in FIG. 1.

Figure 1:
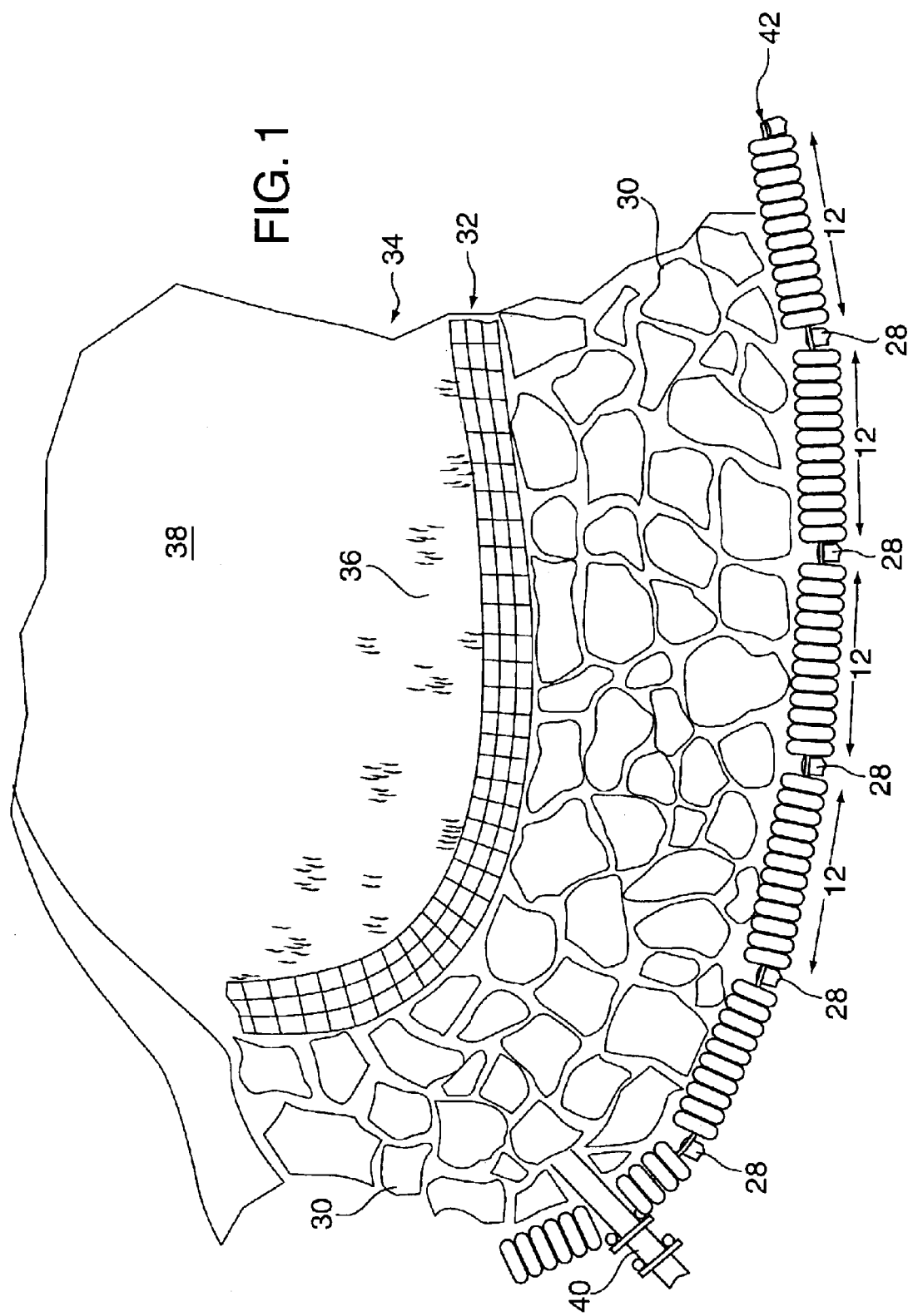
FIG. 1 is a pictorial view helpful in an understanding of a manner of protecting a seawall according to the invention, with the concrete filled automotive tires arranged in a single row.

The pilings in FIG. 1 are shown at 28, with the seawall to be protected being shown at 30. Reference numerals 32, 34, 36 and 38 respectively represent a further barrier of caged stone, a berm, an existing dune area and a beach, for example. Reference numeral 40 represents a drainage pipe for any overflow water pounding over the retainment wall so formed by the line-up of the integrated units 12.

Figure 2:
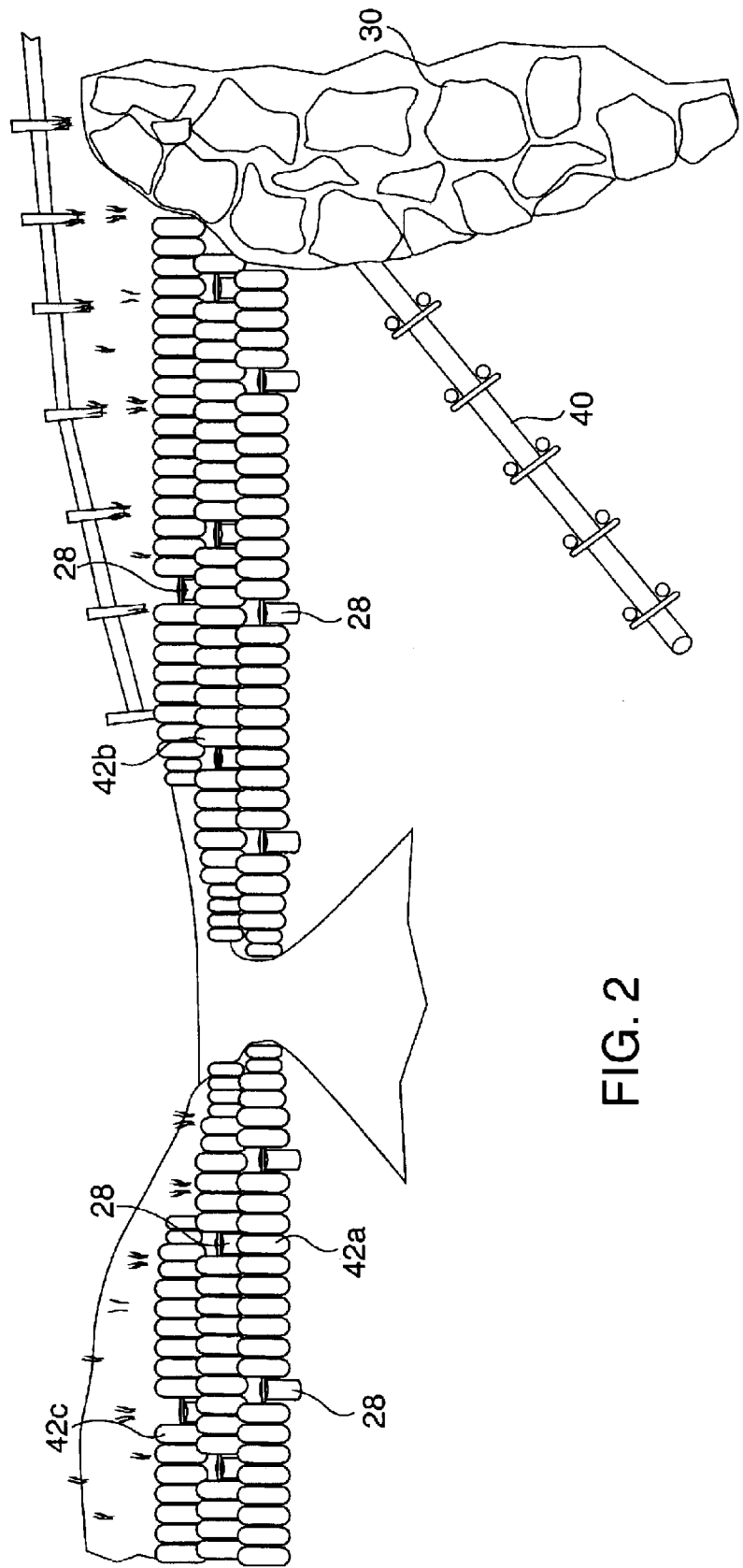
FIGS. 2 & 3 are pictorial views helpful in an understanding of the laddering of the automotive tires of the invention as utilizable in protecting a seawall.

Whereas the arrangement of FIG. 1 would serve quite well for a great many protective barrier systems, occasions may arise where very high tides can be expected, of an extent to override the retainment wall so created by the concrete filled tires. In such a situation, second, third and fourth retainment walls could be erected in similar fashion behind the wall 42 of FIG. 1—as between it and the seawall 30. Such a construction would be one where the successive walls beyond the retainment wall 42 would each be successively higher, one row from another, as shown in FIG. 2, with the individual walls being identified by the reference numerals 42a, 42b, 42c, etc. The construction of each such successive wall could be identical to that of the wall 42—with some modification, the first obviously being that the pilings 28 extend higher above the ground as the rows progress from front to back, as shown.

Figure 3:
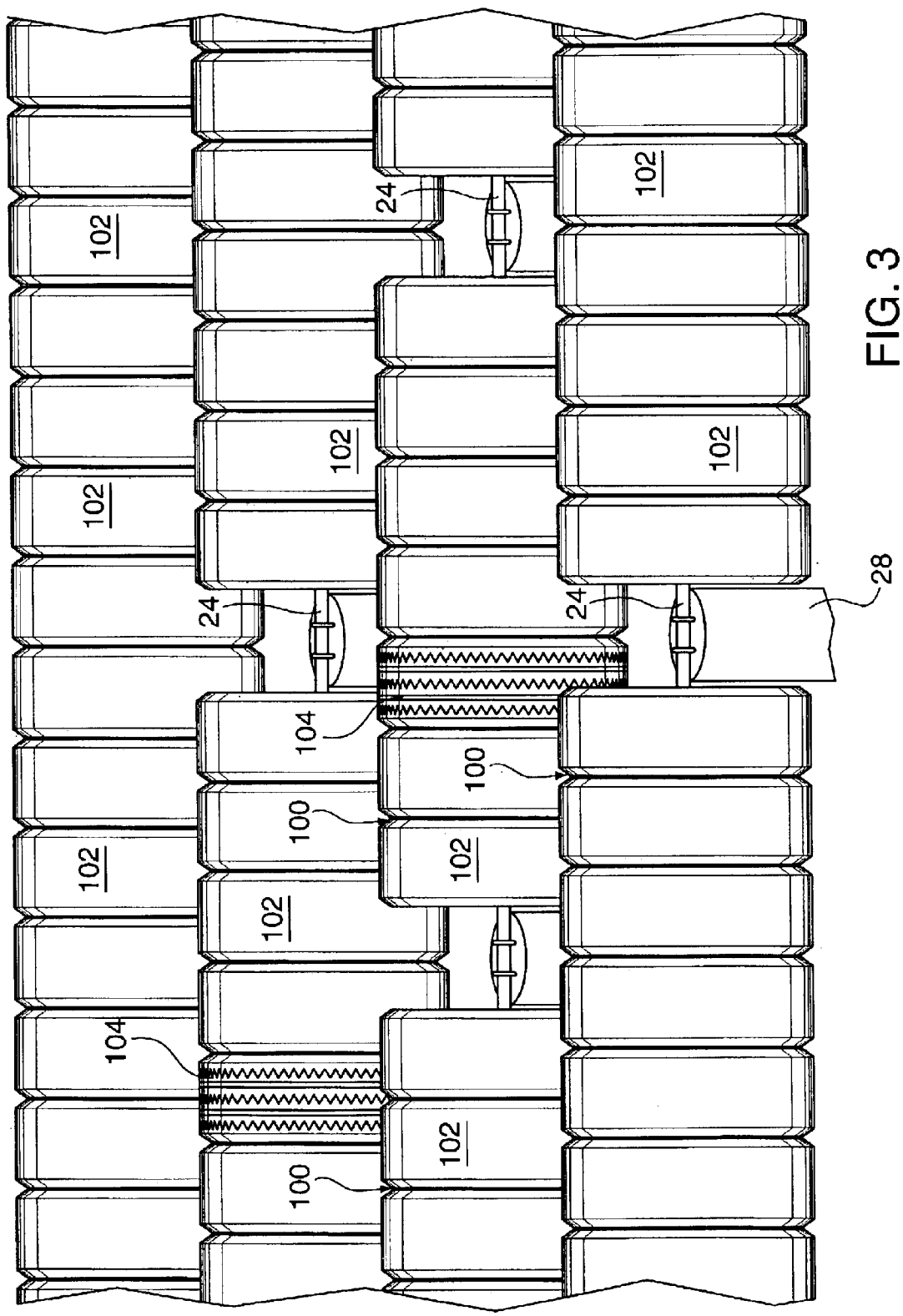

Also, to further slow down any surf that might override each such row in turn, the shore protective barrier system of the invention extends further to offset the tires of each row—from row to row, as shown in FIG. 3. Surf flowing over a first row in the grooves 100 between the adjacent tires 10 would then impact against the flatter portion 102 of the tire in the next higher row progressing from bottom to top. Water flowing up the flatter portion 102 through whatever treads 104 remain in the tires would then similarly be directed toward the offset tread surfaces of the tires above, as well as toward the individual grooves 100 in each higher row. In such construction, as will be seen, the tires of each row sit at a higher elevation than the row below it, but at a lower elevation with respect to the tires in the row above it. While most attractive for seawalls in high, virulent tide areas, the arrangement of FIG. 3 will also be seen helpful in cutting undertows when sunk below a surf line in those areas subject to high, dangerous riptides. In either event, the end result is the ability to use otherwise dormant, landfill occupying automotive tires in a useful manner of providing a protective barrier system to oncoming tides. Even to the extent where the concrete filling the tires may tend to deteriorate with time, the tires which remain holding the concrete residue in place serve to continue the effective life of the barrier system in a manner which requires essentially little, if any, maintenance or future replacement.

While there have been described what are considered to be preferred embodiments of the present invention, it will be readily appreciated that modifications can be made by those skilled in the art without departing from the scope of the teachings herein. Thus, whereas the integrated tire units of the invention have been set out in the context of protecting an existing seawall, it will be seen that they themselves, when coupled together, can form an effective retainment system of their own—a less expensive barrier system where a seawall construction might be cost prohibitive. For at least such reason, therefore, resort should be had to the claims appended hereto for a true understanding of the scope of the invention.

I claim:

1. A shore protective barrier system comprising:
    a first plurality of automotive tires;
    first means for aligning each of said first plurality of automotive tires vertically in a horizontal row substantially side-by-side with one another;
    second means for joining together each adjacent pair of said first plurality of tires in forming a first integrated unit of said first plurality of tires of given horizontal length; and
    third means traversing through said integrated unit for rotating said first integrated unit substantially vertically for filling said automotive tires with concrete, and for rotating said first integrated unit back substantially horizontally for sinking the ends thereof into the ground.

2. The shore protective barrier system of claim 1, also including;
    a second plurality of automotive tires;
    fourth means for aligning each of said second plurality of automotive tires vertically in a horizontal row substantially side-by-side with one another;
    fifth means for joining together each adjacent pair of said second plurality of tires in forming a second integrated unit of said second plurality of tires of given horizontal length;
    sixth means traversing through said second integrated unit for rotating said second integrated unit substantially vertically for filling said second plurality of automotive tires with concrete, and for rotating said second integrated unit back substantially horizontally for sinking opposing ends of said second integrated unit into the ground; and
    seventh means coupling facing ends of said third and sixth means for sinking said first and said second integrated units once rotated back substantially horizontally into the ground from a substantially common elevation.

3. The shore protective barrier system of claim 2 wherein said fourth means includes a second plurality of alignment rods, wherein said fifth means includes a second end cap apertured to receive individual ones of said second plurality of alignment rods, wherein said second plurality of automotive tires are each drilled along side surfaces thereof to receive said second plurality of alignment rods passed through said second end cap, and wherein said sixth means includes a second extension rod traversing through a central aperture of said second end cap beyond the given length of said second integrated unit.

4. The shore protective barrier system of claim 1, also including:
   a second plurality of automotive tires,
   fourth means for aligning each of said second plurality of automotive tires vertically in a horizontally row substantially side-by-side with one another;
   fifth means for joining together each adjacent pair of said second plurality of tires in forming a second integrated unit of said second plurality of tires of given horizontal length; and
   sixth means traversing through said second integrated unit for rotating said second integrated unit substantially vertically for filling said second plurality of automotive tires with concrete and for rotating said second integrated unit back substantially horizontally for sinking opposing ends of said second integrated unit into the ground at a higher elevation than said first plurality of tires is sunk into the ground by said third means.

5. The shore protective barrier system of claim 4 wherein individual tires of said first plurality of automotive tires are offset horizontally with respect to individual tires of said second plurality of automotive tires when said first and second integrated units are sunk into the ground.

6. The shore protective barrier system of claim 1 wherein said first means includes a first plurality of alignment rods, wherein said second means includes an end cap apertured to receive individual ones of said first plurality of alignment rods, wherein said first plurality of automotive tires are each drilled along side surfaces thereof to receive said first plurality of alignment rods passed through said end clap, and wherein said third means includes an extension rod traversing through a central aperture of said end cap beyond the given length of said first integrated unit.

7. A shore protective barrier system comprising:
   a first plurality of automotive tires;
   first means for aligning each of said first plurality of automotive tires vertically in a horizontal row substantially side-by-side with one another;
   second means for joining together each adjacent pair of said first plurality of tires in forming a first integrated unit of said first plurality of tires of given horizontal length;
   third means traversing through said first integrated unit for rotating said first integrated unit substantially vertically for filling said automotive tires with concrete, and for rotating said first integrated unit back substantially horizontally for sinking opposing ends of said first integrated unit into the ground;
   a second plurality of automotive tires;
   fourth means for aligning each of said second plurality of automotive tires vertically in a horizontal row substantially side-by-side with one another;
   fifth means for joining together each adjacent pair of said second plurality of tires in forming a second integrated unit of said second plurality of tires of given horizontal length;
   sixth means traversing through said second integrated unit for rotating said second integrated unit so formed substantially vertically for filling said second plurality of automotive tires with concrete, and for rotating said second integrated unit back substantially horizontally for sinking opposing ends of said second integrated unit into the ground;
   seventh means coupling facing ends of said third and sixth means for sinking said first and said second integrated units once rotated back substantially horizontally into the ground from a substantially common elevation;
   a third plurality of automotive tires;
   eighth means for aligning each of said third plurality of automotive tires vertically in a horizontal row substantially side-by-side with one another;
   ninth means for joining together each adjacent pair of said third plurality of tires in forming a third integrated unit of said third plurality of tires of given horizontal length;
   tenth means traversing through said third integrated unit for rotating said third integrated unit so formed substantially vertically for filling said third plurality of automotive tires with concrete, and for rotating said third integrated unit back substantially horizontally for sinking opposing ends of said third integrated unit into the ground at a higher elevation than said first plurality of tires and said second plurality of tires are sunk by said third and seventh means, respectively;
   a fourth plurality of automotive tires;
   eleventh means for aligning each of said fourth plurality of automotive tires vertically in a horizontal row substantially side-by-side with one another;
   twelfth means for joining together each adjacent pair of said fourth plurality of tires in forming a fourth integrated unit of said fourth plurality of tires of given length;
   thirteenth means traversing through said fourth integrated unit for rotating said fourth integrated unit so formed substantially vertically for filling said fourth plurality of automotive tires with concrete, and for rotating said fourth integrated unit back substantially horizontally for sinking opposing ends of said fourth integrated unit into the ground; and
   fourteenth means coupling facing ends of said tenth and thirteenth means for sinking said third and fourth integrated units once rotated back substantially horizontally into the ground from a substantially common elevation.

8. The shore protective barrier system of claim 7 wherein individual tires of said first and second plurality of automotive tires are offset horizontally with respect to individual ones of said second and fourth plurality of automotive tires when said first, second, third and fourth integrated units are sunk into the ground.

9. The shore protective barrier system of claim 8 wherein said third, seventh, tenth and fourteenth means sink said first, second, third and fourth integrated units into the ground above an existent water line.

10. The shore protective barrier system of claim 8 wherein said third, seventh, tenth and fourteenth means sink said first, second, third and fourth integrated units into the ground below an existent water line.

11. The shore protective barrier system of claim 8 wherein said third, sixth, tenth and thirteenth means comprise individual rebars of steel construction.

12. The shore protective barrier system of claim 8 wherein said first second, third and fourth plurality of tires are each composed of used automotive tires.

13. The shore protective barrier system of claim 7 wherein said seventh means includes a third plurality of alignment rods, wherein said eighth means includes a third end cap apertured to receive individual ones of said third plurality of alignment rods, wherein said third plurality of automotive tires are each drilled along side surfaces thereof to receive said third plurality of alignment rods passed through said third end cap, wherein said ninth means includes a third extension rod traversing through a central aperture of said third end cap beyond the given length of said third integrated unit, wherein said tenth means includes a fourth plurality of alignment rods, wherein said eleventh means includes a fourth end cap apertured to receive individual ones of said fourth plurality of alignment rods, wherein said fourth plurality of automotive tires are each drilled along side surfaces thereof to receive said fourth plurality of alignment rods passed through said fourth end cap, and wherein said twelfth means includes a fourth extension rod traversing through a central aperture of said fourth end cap beyond the given length of said fourth integrated unit.

* * * * *